United States Patent

[11] 3,579,896

| | | | |
|---|---|---|---|
| [72] | Inventor | Thomas Flottorp | |
| | | 207 Argyle St., Regina, Saskatchewan, Canada | |
| [21] | Appl. No. | 842,919 | |
| [22] | Filed | July 18, 1969 | |
| [45] | Patented | May 25, 1971 | |

[54] SPRING-OPERATED FISHING ROD DEVICE
2 Claims, 7 Drawing Figs.

[52] U.S. Cl. ..................................... 43/19,
43/44.86, 124/16
[51] Int. Cl. ..................................... A01k 91/02
[50] Field of Search ........................ 43/19;
124/16; 43/44.86

[56] References Cited
UNITED STATES PATENTS

| | | | |
|---|---|---|---|
| 1,054,916 | 3/1913 | Gray ............................. | 43/19 |
| 1,713,041 | 5/1929 | Fey ............................... | 43/44.86 |
| 2,048,061 | 7/1936 | Donato ......................... | 124/16 |
| 3,261,123 | 7/1966 | Gugliotta ...................... | 43/19 |
| 3,365,834 | 1/1968 | Kreft ............................ | 43/19 |

*Primary Examiner*—Aldrich F. Medbery
*Assistant Examiner*—Daniel J. Leach
*Attorney*—Kent & Ade

ABSTRACT: A device consisting of a tension spring secured by one end thereof to a rod and having an ejector rod extending through the spring to the other end, terminating in a finger-engaging portion so that the spring can be extended, thus drawing the ejector through the spring. A socket is provided on the other end of the ejector rod within which a lure assembly may be engaged so that when the spring is released, the ejector rod is moved forwardly thus ejecting the lure in axial alignment with the coil spring.

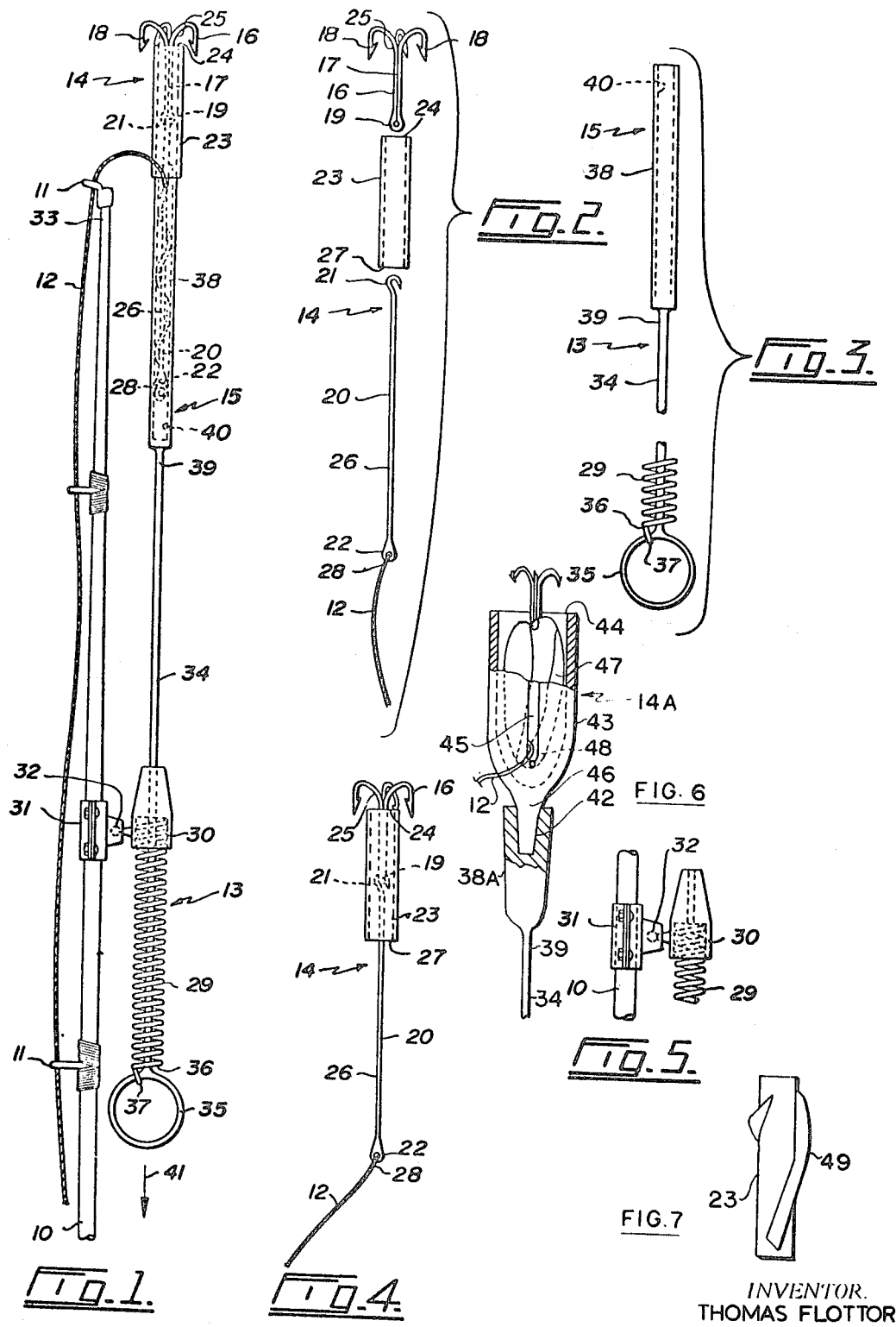

SPRING-OPERATED FISHING ROD DEVICE

This invention relates to new and useful improvements in fishing devices, particularly fishing devices adapted to be used from the shore line in restricted locations where it is not feasible to cast.

Many attempts have been made in the past to provide spring ejector-type devices for fishing rods. However, most of these are relatively complicated and do not permit flexibility in the use of the lure assembly.

The present device overcomes these disadvantages by the provision of a coil-type tension spring secured by one end thereof to the rod and having an ejector rod extending through the spring to the other end thereof which terminates in a finger-engaging portion so that the spring can be extended, thus drawing the ejector rod through the spring. On the other end of the ejector rod is provided a socket within which the lure assembly may be engaged so that when the spring is released, the ejector rod is moved forwardly by the spring, thus ejecting the lure in axial alignment with the coil spring and the ejector rod passing therethrough.

An advantage of the present device is the fact that the spring guides the movement of the ejector rod so that more accuracy is obtained in the placing of the lure where desired.

Another object of the invention is the provision of a pivotal mounting for the spring to the rod thus enabling the lure to be directed at an angle from the axial alignment of the rod.

A still further object of the invention is the provision of the novel lure assembly which enables different-sized hooks to be used, different-colored sleeves, thus giving a reasonable amount of flexibility in the choice of equipment used with the device.

A still further object of the invention is to provide a device of the character herewithin described which is easily attachable to any type of fishing rod.

Still another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying Figures in which:

FIG. 1 is a side elevation of the distal end of a fishing rod with my device thereon.

FIG. 2 is an exploded assembly view of the lure assembly.

FIG. 3 is a fragmentary side elevation of the ejector rod per se.

FIG. 4 is a side elevation of the lure assembly per se.

FIG. 5 is a side elevation showing the mounting of the assembly to the fishing rod.

FIG. 6 is an enlarged partially sectioned side elevation of a modified embodiment.

FIG. 7 is an elevation of the preferred embodiment of the sleeve per se.

In the drawings like characters of reference indicate corresponding parts in the different figures.

Proceeding therefore to describe the invention in detail, reference should be made to the accompanying drawings in which 10 illustrates the distal end of a conventional fishing rod having the usual ferrules 11 secured thereto and along the length thereof.

The fishing line 12 extends through these ferrules to a conventional real either spinning or otherwise (not illustrated).

My assembly comprises the ejector mechanism collectively designated 13, the lure assembly collectively designated 14, and means to mount the lure assembly onto the ejector assembly collectively designated 15.

Dealing first with the lure assembly, reference should be made to FIGS. 2 and 4. In the present drawings, a conventional three-barbed hook 16 is utilized having a shank 17, the three barbs 18, and an eye 19 upon the distal end of the shank opposite to the barbs 18.

An elongated securing rod portion 20 comprises a rod having a hook 21 on one end thereof and an eye 22 on the other end thereof and the hook 21 is adapted to engage the eye 19 on the shank 17. When the securing rod portion is hooked to the eye 19, a cylindrical sleeve 23 is slid over the rod 20 and over the shank 17 until the end 24 thereof engages the beginning of the curved junction 25 between the shank 17 and the barbs 18 so that the sleeve 23 covers the junction between the rod 20 and the eye 19 as clearly shown in FIG. 4. This sleeve can be of any color and can, if desired, be provided with decorative features externally which may be used to attract fish to the lure. This assembly is frictionally held in position against inadvertent displacement during use. The assembly hereinbefore described is easily disassembled and assembled with different-sized hooks or differently decorated connector tubes 23.

When assembled as shown in FIG. 4, it will be seen that the major portion 26 of the rod 20 extends beyond the end 27 of the tube 23, the purpose of which will hereinafter be described. However, at this junction it should be pointed out that the end 28 of the aforementioned fishing line 12 is secured through the eye 22 in the usual manner.

The ejector assembly 23 comprises a coiled tension spring 29 secured within a clamp 30 at the forward end thereof. This clamp 30 is pivotally mounted to a further clamp 31 as indicated by reference character 32 and this clamp 31 engages around the fishing rod 10 and is clamped thereto so that the tension spring 29 extends in a direction remote from the rod tip 33.

An ejector rod 34 extends through a coil spring 29 axially and terminates in a finger-engaging loop 35 and the distal end 36 of the coil spring is secured to this loop either by brazing or hooking the end of the spring around the loop 35 as indicated at 37 in FIG. 3.

A tube 38 is secured upon the distal end 39 of the ejector rod 34 in axial alignment therewith, said tube being provided with an axial bore 40 as shown in phantom in FIG. 3 and this axial bore is adapted to receive the extending end 26 of the rod 20 as shown in FIG. 1.

In operation, the lure assembly is mounted within the tube 38 as hereinbefore described whereupon the spring is extended in the direction of arrow 41 by engagement of the finger of the angler within the loop 35. Due to the swiveling connection between the clamp 30 and the clamp 31, the angler may aim the assembly whereupon he releases the spring 29 so that the spring returns to the closed position, thus moving the ejector rod 34 in a direction opposite to arrow 41, thus ejecting the lure assembly 14 in the desired direction. Due to the connection of the fishing line to the lure assembly, the line is stripped from the reel in the conventional manner and the angler can proceed normally.

FIG. 6 shows a modification in which the tube 38A is provided with a tapered axial bore 42 within the upper end thereof. A lure retaining cup holds the lure assembly collectively designated 14A and this cup is designated 43. It is open at the upper end 44 and is provided with a vertically extending slot 45 in one wall thereof and a tapered stem lower end 46 which frictionally engages within the axial bore 42.

This embodiment permits a lure 47 such as a spoon or the like to be rested within the cup 43 with the line 12, secured to the lower end 48 of the lure, residing within the slot 45.

The operation is similar to that hereinbefore described, it being understood that the cup 43 remains in engagement with the tube 38A.

Also of note is the fact that I have provided what I term rifling inducing fins 49 secured to the outer surface of the sleeve 23 as shown in FIG. 7. These can be spirally extending strips as illustrated and the object is to not only assist in maintaining the direction of the lure as it is ejected from the assembly but also, and more importantly, to induce a rotary or rifling action when the lure assembly is being retrieved through the water thus adding to the attraction of the device to the fish being sought.

Since various modifications can be made within the scope of the inventive concept which is herein disclosed and/or claimed.

I claim:

1. In a fishing rod device including a conventional fishing rod, reel, and line associated with said reel; a device for ejecting a lure from said rod, said device comprising a lure assembly secured to the free end of said fishing line, a spring ejector assembly secured to said rod and means to detachably mount said lure assembly to said spring ejector assembly, said spring ejector assembly comprising an elongated tension coil spring, clamp means pivotally mounting one end of said spring to said rod, and en ejector rod secured by one end thereof to the other end of said tension coil spring and extending through said tension coil spring towards the tip end of said rod, said lure assembly including a hook portion, a securing rod portion, and a sleeve portion, said hook portion including a shank, and an eye in one end of said shank, said securing rod portion including a hook on one end thereof engageable within said eye, and a line attaching eye on the other end of said rod portion, said sleeve portion engaging over the junction between said rod portion and said shank when said hook on said rod portion is engaged within said eye on said shank, said sleeve including rifling inducing fins on the outer wall thereof.

2. The device according to claim 1 in which said means to detachably mount said lure assembly to said spring ejector assembly includes a tubular socket on the other end of said ejector rod, one end of said lure assembly being engageable within said socket.